United States Patent [19]
Suzuki et al.

[11] Patent Number: 5,371,862
[45] Date of Patent: Dec. 6, 1994

[54] PROGRAM EXECUTION CONTROL SYSTEM

[75] Inventors: Shinichiro Suzuki, Tokyo; Yoichiro Takeuchi, Urawa, both of Japan

[73] Assignee: Kabushiki Kaisha Toshiba, Kawasaki, Japan

[21] Appl. No.: 841,511

[22] Filed: Feb. 26, 1992

[30] Foreign Application Priority Data

Feb. 27, 1991 [JP] Japan .................................. 3-031167

[51] Int. Cl.⁵ .............................................. G06F 9/38
[52] U.S. Cl. ............................ 395/375; 364/DIG. 2; 364/231.8; 364/261.5; 364/263; 364/938.1; 364/938.2; 364/948; 364/948.3
[58] Field of Search ................... 364/DIG. 1, DIG. 2; 395/375

[56] References Cited

U.S. PATENT DOCUMENTS

| | | | |
|---|---|---|---|
| 3,979,725 | 9/1976 | Disparte et al. | 395/375 |
| 4,124,893 | 11/1978 | Joyce et al. | 395/375 |
| 4,407,015 | 9/1983 | Ziobro | 364/200 |
| 4,766,531 | 8/1988 | Huntsman et al. | 364/200 |
| 4,907,192 | 3/1990 | Kaneko | 395/375 |
| 5,127,091 | 6/1992 | Boufarah et al. | 395/375 |

*Primary Examiner*—Kevin A. Kriess
*Assistant Examiner*—Lucien Toplu
*Attorney, Agent, or Firm*—Oblon, Spivak, McClelland, Maier & Neustadt

[57] ABSTRACT

A program execution control system is provided for a processing unit of a computer. An exclusive register has a plurality of 1-bit flag in which true and false data can be individually set and which can individually specify a flag for determining whether execution of each instruction in the program is canceled or not for each instruction. This provides for an integer, logic operation and comparison and a memory for storing an instruction word which contains a flag specifying filed in the exclusive register for determining whether execution of the instruction is canceled or not based on a value stored in the exclusive register, a condition is also provided specifying sub-operation code filed for an operand by use of a numeric value and a flat bit for storing a resulting value of true or false for given condition when the instruction sets the flat for setting the resultant value of truth or falsehood of the condition specified to the instruction of the condition specifying sub-operation code filed in the exclusive flat register specified to the instruction of the flag bit specifying operand field and for canceling the instruction according to at least one of a value of the exclusive register means specified to the instruction of the flat bit specifying filed indicating to cancel the instruction whether the value is "1" or "0".

10 Claims, 12 Drawing Sheets

EXAMPLE 1) if (A&&(B||C)) [EXECUTABLE STATEMENT];
WHERE A,B AND C ARE INDEPENDENT CONDITIONS

FOR THE ABOVE STATEMENT THE FOLLOWING EXECUTION
IF A IS (a1>a2) B IS (b1==b2) AND C IS (c1<=c2) FOR EXAMPLE

| LABEL | MNEMONIC    | COMMENT                                                     |
|-------|-------------|-------------------------------------------------------------|
|       | CMP a1, a2  | ; SET FLAG ACCORDING TO RESULT OF a1-a2                     |
|       | JMP:LE L1   | ; CHECK FLAG AND BRANCH TO L1 IF A IS FALSE                 |
|       | CMP b1, b2  | ; SET FLAG ACCORDING TO RESULT OF b1-b2                     |
|       | JMP:EQ L2   | ; CHECK FLAG AND BRANCH TO L2 IF B IS TRUE                  |
|       | CMP c1, c2  | ; SET FLAG ACCORDING TO RESULT OF c1-c2                     |
|       | JMP:GT L1   | ; CHECK FLAG AND BRANCH TO L1 IF C IS FALSE                 |
| L2:   |             | ROUTINE OF [EXECUTABLE STATEMENT]                           |
| L1:   |             |                                                             |

FIG. 1A
(PRIOR ART)

EXAMPLE 2)  if (a==b)   i++;
            else        j++;

THIS STATEMENT IS EXECUTED AS FOLLOWS, FOR EXAMPLE

| LABEL | MNEMONIC | COMMENT |
|---|---|---|
| | CMP a,b | ; SET FLAG ACCORDING TO RESULT OF a-b |
| | JMP:EQ L1 | ; BRANCH TO L1 IF SPECIFIED CONDITION IS TRUE |
| | ADD j,1,j | ; EXECUTABLE STATEMENT WHEN SPECIFIED CONDITION IS FALSE |
| | JMP L2 | ; BRANCH TO LAST, END |
| L1: | ADD i,1,i | ; EXECUTABLE STATEMENT WHEN SPECIFIED CONDITION IS TRUE |
| L2: | | |

FIG. 1B
(PRIOR ART)

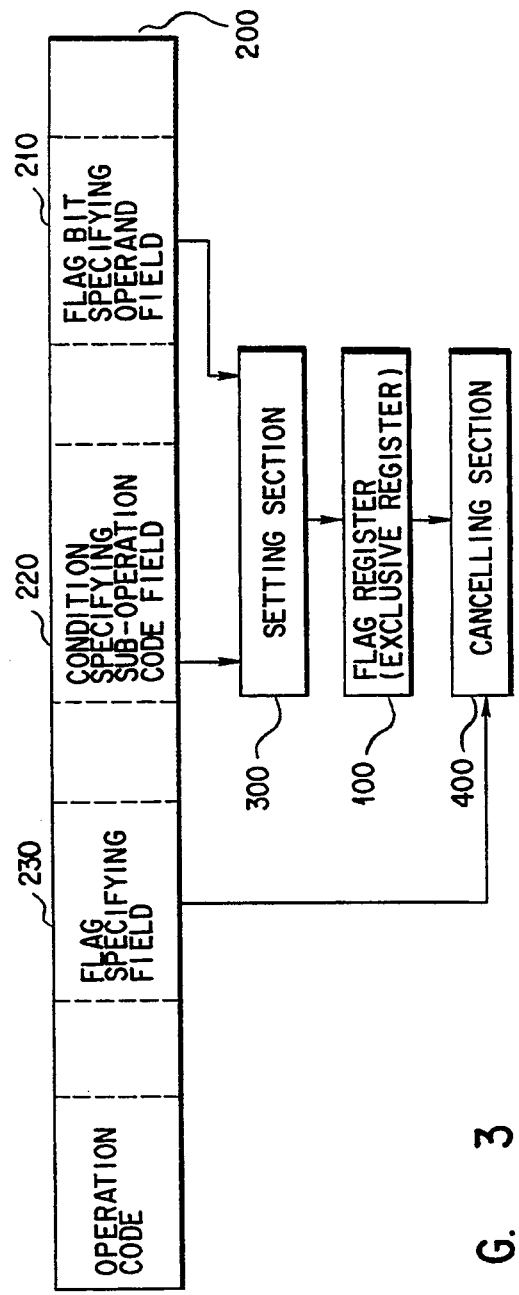
F I G. 3

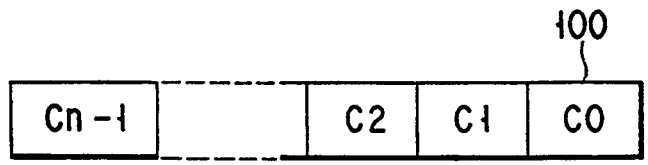
FIG. 4
```
── SET : CONDITION O1, O2, Ci ──
CONDITION OF OPERANDS O1, O2 : EQ(=), LT(<), GE(≧) ETC.
            SET "1" OR "0" INTO FLAG Ci WHEN THE
            CONDITION IS TRUE OR FALSE RESPECTIVELY
O1, O2 : OPERANDS FOR CONDITION DETERMINATION
Ci     : SPECIFICATION OF FLAG TO BE SET
         i IS 0~(n-1)
```
FIG. 5
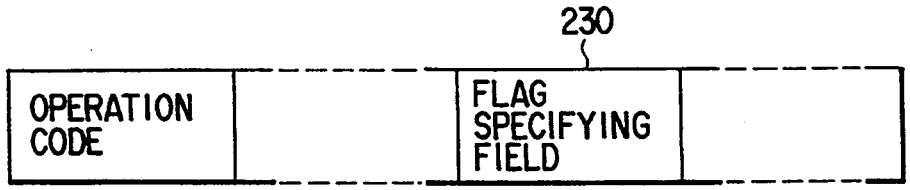
INSTRUCTION WORD 200
FIG. 6

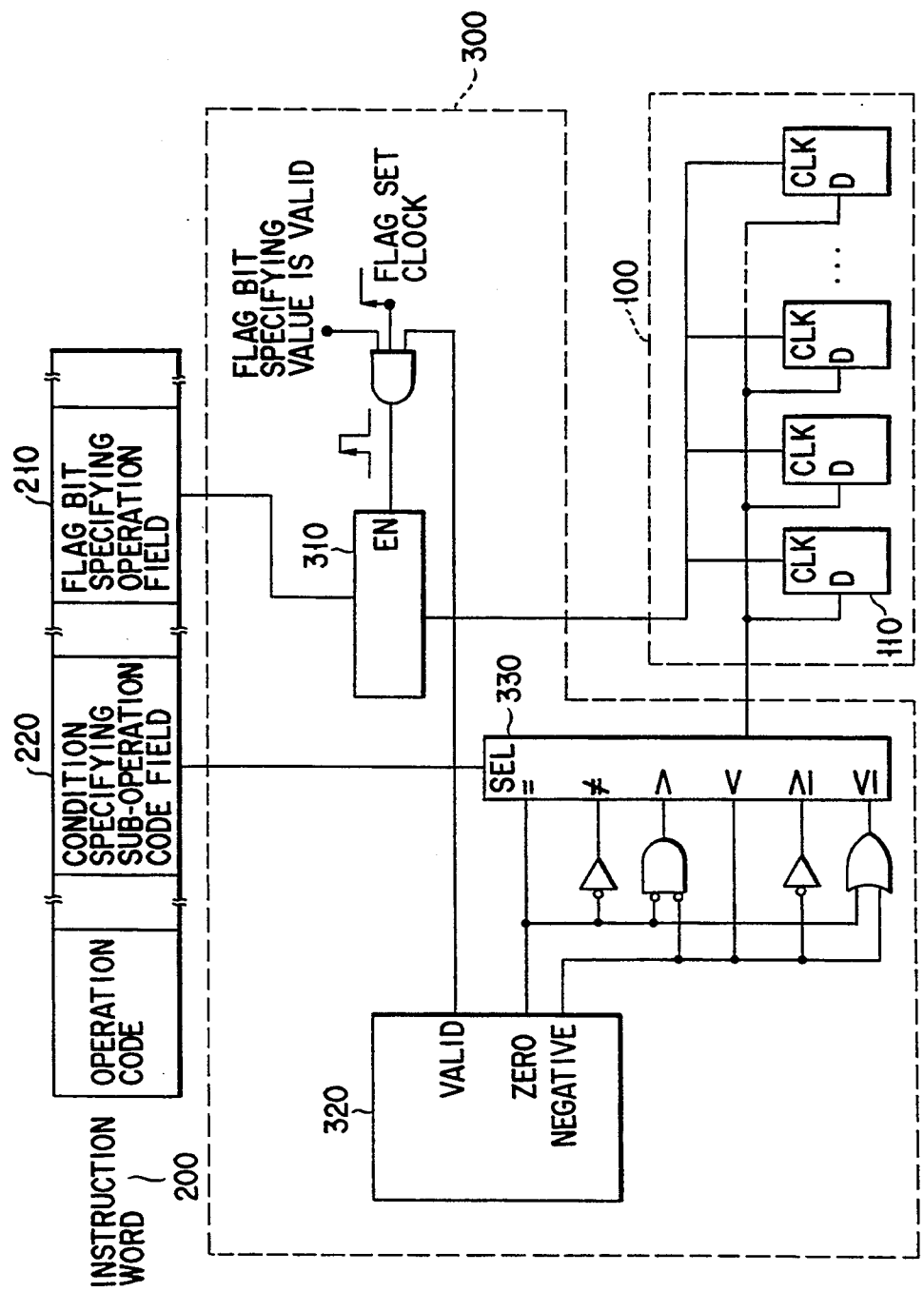
F I G. 7

EXAMPLE 1)  if (A&&(B||C)) [EXECUTABLE STATEMENT 1];
            WHERE A B AND C ARE INDEPENDENT CONDITIONS

FOR THE ABOVE STATEMENT THE FOLLOWING EXECUTION
IF A IS (a1>a2) B IS (b1==b2) AND C IS (c1<=c2) FOR EXAMPLE

| LABEL | MNEMONIC | COMMENT | |
|---|---|---|---|
| | SET:GT a1,a2,f3 | ; IF A IS TRUE, f3=1 AND IF A IS FALSE, f3=0 | (1) |
| | SET:EQ b1,b2,f2 | ; IF B IS TRUE, f1=1 AND IF B IS FALSE, f1=0 | (2) |
| | SET:LE c1,c2,f3 | ; IF C IS TRUE, f2=1 AND IF C IS FALSE, f2=0 | (3) |
| | AND:f,0EH,R0 | ; SUBSTITUTE (F∧110B) INTO REGISTER R0 | (4) |
| | SET:GT R0,8H,f1 | ; IF R0>8, f1=1 AND IF R0≦8, f1=0 | (5) |
| | ?f1 JMP L1 | ; IF f1==0, SKIP (7) | (6) |
| | ROUTINE OF [EXECUTABLE STATEMENT 1] | | (7) |
| L1: | | | (8) |

F I G. 10A

EXAMPLE 2)  if (a==b)    i++;
            else         j++;

THIS STATEMENT CAN BE EXECUTED BY THE FOLLOWING
THREE INSTRUCTIONS.

| LABEL | MNEMONIC | COMMENT |
|---|---|---|
|  | SET:EQ a,b,f1 | ;IF a≠b, C=1 AND IF a=b, C1=0 |
|  | ?!f1 ADD i,1,i | ;IF f1=1, i++ IS EXECUTED AND |
|  |  | ;IF f1=0, i++ IS NOT EXECUTED |
|  | ?f1 ADD j,1,j | ;IF f1=0, j++ IS EXECUTED AND |
|  |  | ;IF f1=1, j++ IS NOT EXECUTED |

FIG. 10B

EXAMPLE 1) if (A&&(B||C)) [EXECUTABLE STATEMENT] ;
WHERE A B AND C ARE INDEPENDENT CONDITIONS

FOR THE ABOVE STATEMENT THE FOLLOWING EXECUTION IS EFFECTED
IF A IS (a1>a2) B IS (b1==b2) C IS (c1<=c2) AND [EXECUTABLE STATEMENT]
CAN BE EXECUTED BY USE OF THREE INSTRUCTIONS FOR EXAMPLE

MNEMONIC

SET:GT a1,a2,f3              SET:EQ b1,b2,f2              SET:LE c1,c2,f3
AND:F, 0EH, R0
SET:GT R0,8H,f1
INSTRUCTION 1 OF ?!f1        INSTRUCTION 2 OF ?!f1        INSTRUCTION 3 OF ?!f1
[EXECUTABLE STATEMENT]       [EXECUTABLE STATEMENT]       [EXECUTABLE STATEMENT]

EXAMPLE 2)  if (a==b)   i++ ;
            else        j++ ;

THIS STATEMENT CAN BE EXECUTED BY THE FOLLOWING TWO CYCLES

MNEMONIC
SET:EQ a,b,f1
?!f1 ADD i,1,i  ?f1 ADD j,1,j

F I G. 11A

EXAMPLE 3)  if ( a )
                if ( b )    func 1 ;
                else        func 2 ;
            else
                if ( b )    func 3 ;
                else        func 4 ;

FOR EXAMPLE, IT IS EXECUTED BY USE OF TABLE OF HEAD ADDRESS OF EACH FUNCTION

LABEL   MNEMONIC

SET:EQ a,0,f3        SET:EQ b,0,f2
        AND:F,0CH,R0
        CALL [R0]            ;--------- R0=L1+(FA100B)

L1:     func1, func2, func3, func4 ;  ------- 4byte x 4 ADDRESS·TABLE

FIG. 11B

PROGRAM EXECUTION CONTROL SYSTEM

BACKGROUND OF THE INVENTION

1. Field of the Invention

This invention relates to a program execution control system for the condition determination, conditional branch and condition execution process of a program for the processing unit of a computer.

2. Description of the Related Art

Conventionally, the condition processing in the processing unit is effected as follows. The processing unit stores the logical comparison or operation result in a single flag indicating zero, positive or negative. The processing unit uses a conditional branch instruction for branching when the flag satisfies a specified condition. Therefore, as shown in two examples (which are described by C language) of FIGS. 1A and 1B, an if-statement having the compound condition is executed, and the conditional branch must be repeatedly executed by sequentially comparing the individual conditions in order.

Recently, when the branch is executed in a computer of pipeline processing system usually used as the high-speed processing method, instructions read out and stored until the branching is started are made invalid as shown in FIG. 2. Further, in the above computer, read-out of the branch destination instruction will be postponed until the branch destination address is created and made ready for readout. As described above, the branch instruction is a main factor which may disturb the flow of pipeline process and lower the processing performance in the general computer of pipeline processing system. In FIG. 2, F, D, E and W indicate respective processing stages in the pipeline processing feature. F indicates the instruction fetch stage, D indicates the decode stage, E indicates the execution stage, and W indicates the result writing stage. OP1 indicates an instruction generated immediately before the branch instruction. B indicates the branch instruction. OP2 and OP3 respectively indicate the instruction allocated immediately after the branch instruction, which is fetched by the instruction fetch stage and positioned thereafter discarded by the branching. OP4 indicates the instruction of a branch destination. OP5, OP6 and OP7 indicate the instructions executed after the instruction OP4. TD indicates the apparent process interruption time. TD' indicates a period of time from when the branching is recognized until the branch destination can be made ready for fetching.

As a method for solving the above problem, there is provided a delayed branch system for continuously effecting the pipeline process by arranging an instruction to execute before branch also in a cycle from the time immediately after the branch instruction is specified until the time immediately before the branch destination instruction is read out, that is, in a delayed-slot. However, it is difficult to arrange instructions in all the delayed-slots. Therefore, in the conventional processing system in which the branch instruction tends to frequently occur, problems that the performance is lowered by the branch instruction will frequently occur.

In the conventional system, since only one set of flags of comparison results or the like is used and the condition determination is effected by use of the branch instruction, the condition determination must be sequentially made. Thus, in a computer of parallel processing system capable of simultaneously executing a plurality of instructions, it is difficult to effect the condition processes in parallel.

The following method is provided to solve the above problem.

The result of comparison or the like can be stored into a desired general register and the results of individual conditions are previously stored into individual registers. After this, the condition determination for them is made. With this method, it is only required to use one branch and the possibility of the condition processes in parallel can be enhanced. However, in this system, valuable registers of a number corresponding to the number of conditions are necessary. Therefore, in this system, the efficiency of usage of the registers is lowered and consequently the frequency of the memory access becomes high, thereby lowering the performance. As a result, in this system, the effect that the number of branch instructions is decreased and the possibility of parallel process is enhanced can be attained, but a large number of bad side effects occur.

As described above, in the conventional program execution control system, firstly, when the branches such as "IF-ELSE IF- . . . ELSE" constructed by a plurality of conditions are compiled and executed, the conditional branch must be executed while checking individual conditions. Therefore, the code creation efficiency and execution speed cannot be enhanced. Secondly, since the number of branches tends to be increased, an influence of reduction in the processing speed due to disturbance and interruption of the pipeline in the branch is large in a computer of pipeline processing system. Thirdly, since the result of comparison instruction or the like is set into a flag at one place, the result of comparison made before another comparison is made is rewritten after the latter comparison is made and cannot be used. Therefore, simultaneous determination of the compound condition or parallel condition processing cannot be effected. Fourthly, in a computer in which the determination result of the register is saved, the efficiency of usage of the registers is low, thereby lowering the performance.

SUMMARY OF THE INVENTION

An object of this invention is to provide a program execution control system having the following features.

(1) A program execution control system capable of reducing the number of branch instructions for the same program and determining the compound condition at the same time.

(2) A program execution control system for realizing a statement having a plurality of branch destinations corresponding to the condition by use of one branch instruction execution.

(3) A program execution control system capable of enhancing the code creation efficiency, lowering the frequency of generation of branch instructions, enhancing the possibility of the parallel processing of condition determination and enhancing the operation speed based on the above-described effects in the condition execution parallel processing of a computer.

In order to attain the above object, a program execution control system of this invention is characterized by comprising exclusive register means 100 including a plurality of 1-bit flag means in which true and false data can be individually set and which can individually specify a flag for determining whether execution of each instruction in the program is canceled or not for each instruction and having a function as an operand of at least one of an integer, logic operation and comparison; memory means for storing an instruction word 200 which contains a flag specifying field 230 specifying at least one of said particular flag means in said exclusive register means determining whether execution of the instruction is canceled or not based on a value stored in said exclusive register and means for canceling the execution of the instruction when a value stored in said flag means is whether "1" or "0", and further contains a condition specifying sub-operation code field 220 for specifying a condition for an operand by use of a numeric value and a flag bit specifying operand field 210 for specifying said particular flag means in said exclusive register means storing a resulting value of true or false for given condition when the instruction sets said flag means; setting means 300 for setting the resultant value of truth or falsehood of the condition specified to the instruction of said condition specifying sub-operation code field into the flag means in said exclusive flag register means specified to the instruction of said flag bit specifying operand field when an instruction determining said flag means is executed; and canceling means 400 for canceling the instruction according to at least one of a value of the flag means in said exclusive register means specified to the instruction of said flag bit specifying field and a specified value in said flag specifying field indicating to cancel the instruction whether the value is "1" or "0".

A program execution control system of this invention realizes the condition execution of the conditional branch and various instructions by setting a specified flag according to a condition and canceling the execution of the corresponding instruction according to the value of the flag specified for each instruction. As a result, the program execution control system of this invention makes it possible to reduce the number of branch instructions for the same program and simultaneously determine the compound condition. Further, the program execution control system of this invention realizes a statement having a plurality of branch destinations corresponding to the condition by execution of a single branch instruction. In addition, in the program execution control system of this invention, the possibility of parallel process in the processing unit can be enhanced.

As described above, according to the program execution control system of this invention, the following effects can be attained. Firstly, the compound condition can be determined at one time. Secondly, a statement having a plurality of branch destination corresponding to the condition can be executed by one branch. Thirdly, different processes corresponding to the condition can be effected with a less frequency of generation of branch instructions in comparison with the conventional case or without using the branch instruction. Therefore, the disturbance of a pipeline which may cause degradation in the performance of a general computer of pipeline processing system can be suppressed. Fourthly, a plurality of the results of condition determination the comparison results and the like can be stored in different locations. As a result, the results of condition determination made in the past can be used again and the possibility of parallel execution of the condition process can be enhanced. Particularly, in a computer of parallel processing system, code creation of higher efficiency can be attained and the performance can be significantly improved. Fifthly, the above first to fourth effects can be attained without giving any influence on the efficiency of usage of registers.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 1A and 1B show examples of the conventional condition processing system;

FIG. 3 is a diagram showing the whole construction according to a first embodiment of this invention;

FIG. 4 is a diagram showing the construction of a flag register (exclusive register);

FIG. 5 is a diagram showing the contents of a conditional flag setting instruction;

FIG. 6 is a diagram showing the construction of an instruction word;

FIG. 7 is a block diagram for illustrating the execution function of a set instruction for setting a flag register according to the comparison result of operands in a case where the number n of flags is 16;

FIGS. 10A and 10B show examples in which the system of this invention is applied to a case wherein an if-statement having the compound condition is executed; and FIGS. 11A and 11B show examples in which the system of this invention is applied to a computer of parallel processing system for simultaneously executing three or more instructions.

DETAILED DESCRIPTION OF THE PREFERRED EMBODIMENTS

Figure 2:
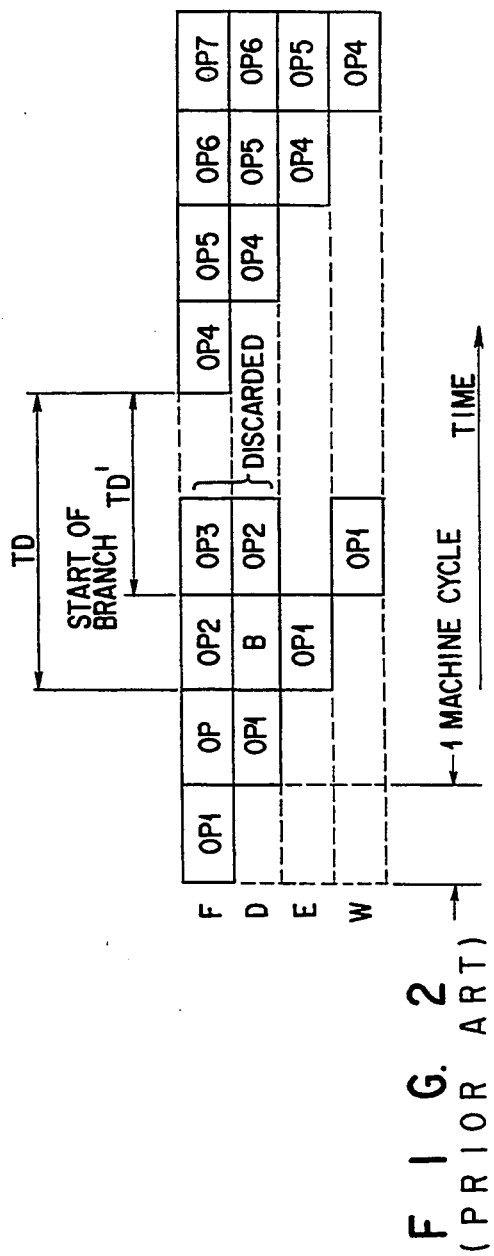
FIG. 2 is a diagram showing an example of the operation at the branching time in the conventional pipeline processing system.

There will now be described an embodiment of this invention with reference to the accompanying drawings.

FIG. 3 is a block diagram showing the schematic construction of a program execution control system according to one embodiment of this invention. In FIG. 3, the program execution control system of this invention basically includes a flag register (exclusive register) 100; means for storing an instruction word 200 containing a flag specifying field 230, a condition specifying sub-operation code field 220 and a flag bit specifying operand field 210, the fields 220 and 210 are respective instructions for setting the flag; a setting section 300 for setting the flag specified by the flag bit specifying operand field 210; and a canceling section 400 for canceling the instruction word 200 containing the flag specifying field 230. With the above construction, the resultant value of truth or falsehood of the condition of a source operand of the instruction represented by the condition specifying sub-operation code of the instruction for determining the flag is set in a particular flag unit 110 in the flag register 100 specified as a destination operand of the instruction and the instruction is canceled based on a value corresponding to the truth or falsehood of the value set in the flag unit 110 specified by the flag specifying field 230.

The detail function of each section shown in FIG. 3 is explained with reference to FIGS. 4 to 8.

FIG. 4 shows the construction of the flag register 100. The flag register 100 includes a plurality of flag units C0 to Cn-1 which are used as one bit unit. Like the other general register, the flag register 100 is an exclusive register which can also be used as a register capable to readout and it can be specified as the source operand for the comparison, operation and the like instruction.

FIG. 5 shows the instruction for setting the flag, i.e., the contents of a conditional flag setting instruction. The value of the flag unit specified according to the truth or falsehood of the specified condition is set to "1" or "0" by the conditional flag setting instruction.

FIG. 6 shows the construction of the instruction word 200. The flag specifying field 230 in the instruction word 200 is contained in all the instruction word and specifies a particular flag unit used for canceling the execution of an instruction of the instruction word 200. And/or the flag specifying field 230 determines canceling corresponding instruction word 200 by meaning of the value of the flag, i.e., whether the value set in the flag is "1" or "0". In the embodiment of the present invention described hereinafter, the flag specifying field 230 determines both the flag and meaning thereof. In this case, when n is the number of the flag unit 110 capable of being specified, the size of the field 230 is $(1 + \uparrow \log_2 n \uparrow)$ bits. In this case, $\uparrow$ indicate round-off.

FIG. 7 is a block diagram for illustrating the execution function of a conditional flag setting instruction for setting the particular flag unit 110 in the flag register 100 according to the comparison result of operands in a case where the number n of the flag units is 16.

In FIG. 7, the instruction word 200 is an instruction word of the conditional flag setting instruction. The condition for the operand of the conditional flag setting instruction is specified as a numeric value in the condition specifying sub-operation code field 220. The number of the flag unit 110 set in the flag register 100 is specified in the flag bit specifying operand field 210.

A binary decoder 310 outputs a logic value "1" from one of the 16 outputs according to a 4-bit input value. All of the outputs of the decoder 310 are set to "0" when an enable input EN=0. An operand comparator 320 compares operand values specified by the instruction, outputs Valid=1 when the comparison result is validated, and outputs Zero=1 or Negative=1 respectively when the comparison result is "0" or negative. A first data selector 330 selects one of the inputs according to a 3-bit input specifying value and outputs the same.

The flag unit 110 is constructed by q data flip-flop in this embodiment. A flag register is constructed by a plurality of the data flip-flops. Data D ("1" or "0") is set in the data flip-flop by the rise of a clock CLK.

The function of setting the truth or false of a specified condition into the specified flag unit in the flag register 100 is explained with reference to FIG. 7. In FIG. 7, the condition specifying field 220 corresponds to the condition of FIG. 5 and the flag bit specifying field 210 corresponds to Ci of FIG. 5.

According to FIG. 7, the operand comparator 320 checks the operand specified by the instruction. The comparator 320 derives logic signals indicating the truth or falsehood for the relations of $=, \neq, <, >, \leq,$ and $\geq$ (respectively corresponding to EQ, NE, LT, GT, LE, GE of the FORTRAN language) between operands. The first data selector 330 selects one of the logic signals by use of the condition specifying field 220 and supplies the value of the selected logic signal to the flag register 100. Further, the decoder 310 supplies a clock pulse only to a flip-flop corresponding to the flag unit 110 specified by the flag bit specifying field 210. By the above method, a value indicating the truth or falsehood of the specified condition is set into the specified flag unit 110 in the flag register 100.

Figure 8:
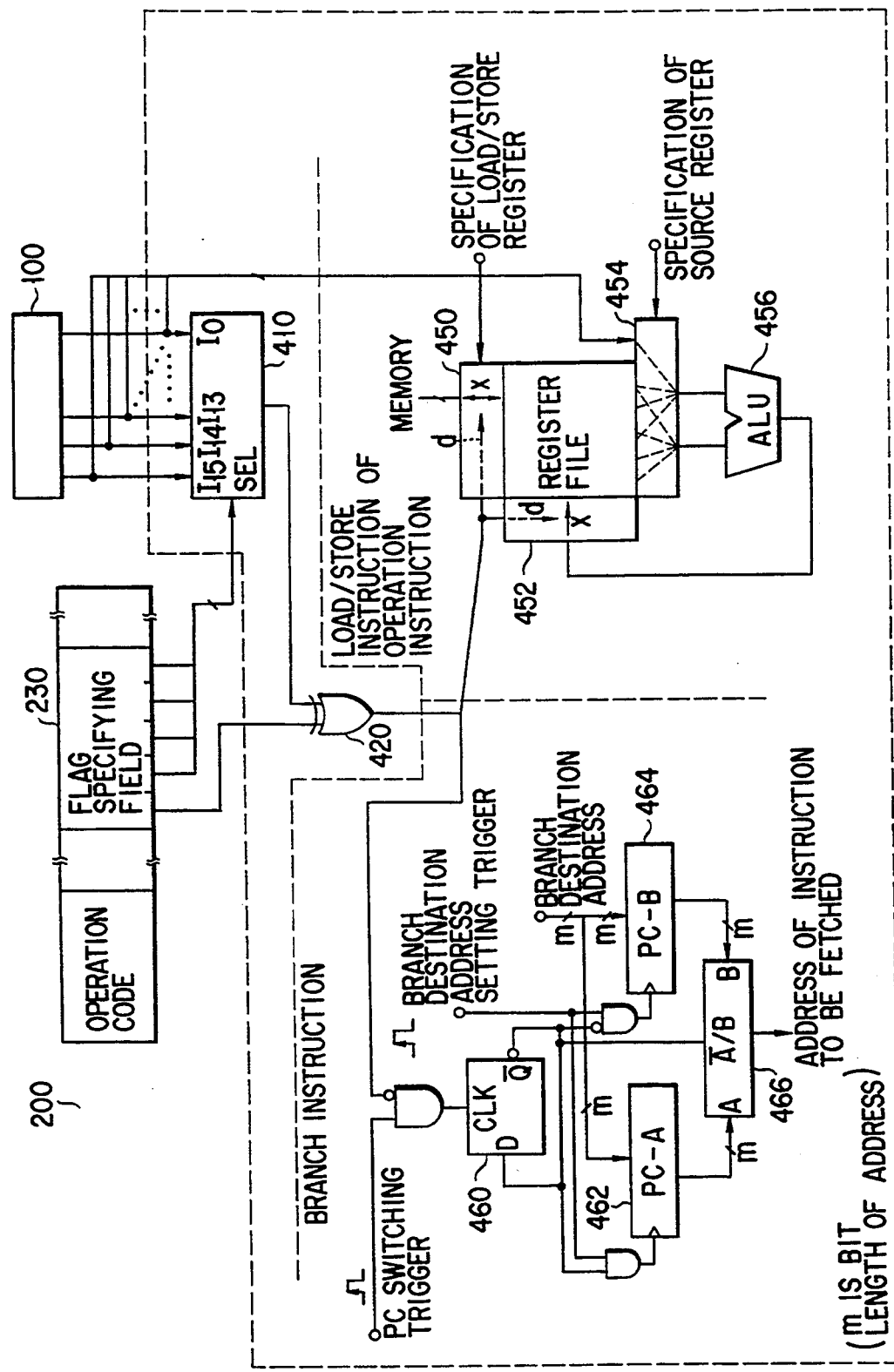
FIG. 8 is a block diagram for illustrating the canceling feature of an instruction in a case where the number n of flags is 16.

FIG. 8 is a block diagram for illustrating the canceling feature of the instruction when the number n of the flag units is 16.

In FIG. 8, the flag register 100 outputs values of respective flag bits. A corresponding one of the flag units 110 is specified by the values of the low-order four bits of the flag specifying field 230 and the meaning of the flag is specified by the high-order one bit. For example, when the high-order one bit of the field 230 is "0" and the value stored in the flag unit 110 is "1", the flag means "canceling". A second data selector 410 selects and outputs one of input 16 bits according to a 4-bit value. An Ex-OR gate 420 outputs an exclusive OR between meaning of a flag specified as a canceling signal (1 indicated "cancel") by the flag specifying field 230 and a value stored in the specified flag unit 110.

A memory port 450 with inhibition input permits data transfer between the main memory and a specified register. This port 450 can inhibit the transformer by an input d and, for example, it is inhibited when d=1. A write-back mechanism 452 with inhibition input writes back the result of operation instruction, that is, an output of an ALU 456 into a particular register. The write-back mechanism 452 inhibits the write-back operation by an input d. For example, the write-back is inhibited when d=1. A source register selection mechanism 454 outputs the content of a specified register into the ALU 456. In this case, the flag register 100 can also be specified by the selection mechanism 454 like the other registers.

A flip-flop 460 outputs a logic value which is inverted in response to the rise of a pulse input to the CLK terminal. Program counters 462 and 464 output an address of an instruction to be next fetched. As an actual address, one of the outputs of the program counters 462 and 464 is selected. A branch destination address is immediately loaded into one of the program counters 462 and 464 whose output is not selected at the time of generation of the branch instruction. A data selector 466 selects one of the outputs of the program counters 462 and 464 and outputs an address of an instruction to be next fetched.

Referring to FIG. 8, the function of canceling an instruction according to the truth and false of a value set in the specified flag unit is explained.

The second data selector 410 selects one of the flag units 110 of the flag register 100 according to the low-order four bits of the flag specifying field 230 and outputs the value thereof. A result of an exclusive OR among the outputs, that is, the value of the specified flag, the high-order one bit of the flag specifying field 230, that is, the meaning specifying bit of a flag (the value of the flag is set to "1" (or "0") to indicate "canceling" when the bit is "0" (or "1")) and the value of a specified flag, is output as an instruction canceling specifying signal via the Ex-OR gate 420. When the signal is true ("1"), execution of the instruction is canceled by the above canceling function.

In the case of an operation instruction, for example, the same condition as in a case wherein the instruction is not executed can be set by supplying the canceling signal to the write-back mechanism 452 with inhibition input and inhibiting the write-back of the operation result when the canceling signal is true. In the case of a load/store instruction (memory-register transfer instruction), the canceling is effected by supplying the canceling signal to the memory port 450 with inhibition input instead of the write-back mechanism 452 with inhibition input and inhibiting the transfer between the memory and the register when the canceling signal is true.

In the case of a branch instruction, the canceling is effected by first setting a branch destination address into one of the program counters 462 and 464 which is not used now and inhibiting the operation of changing the program counter which should be used when the canceling specifying signal is true from the program counter which is now used to the program counter in which the branch destination address is set.

Figure 9A:
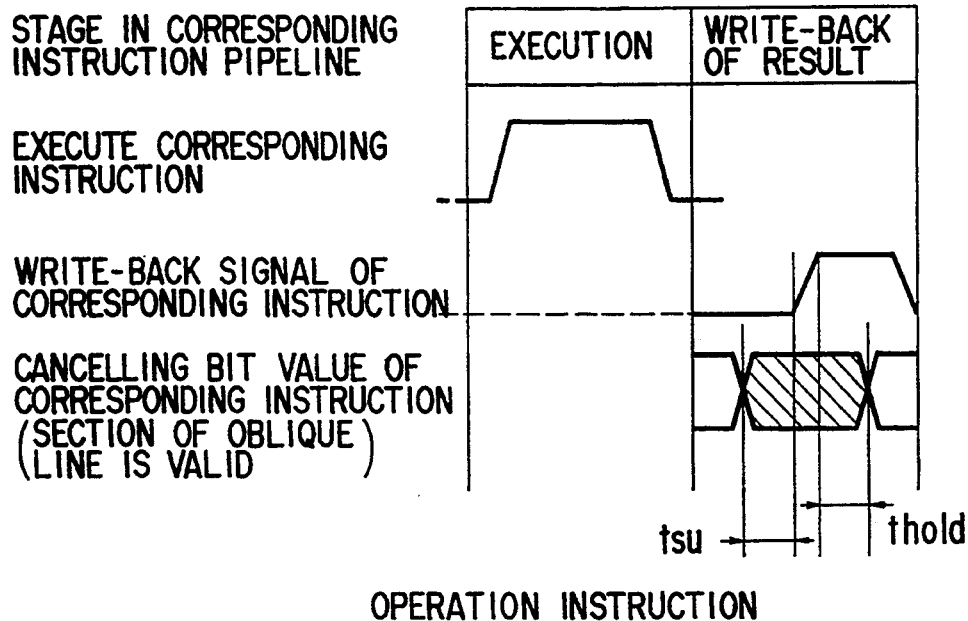
FIGS. 9A to 9C are timing charts showing timings for execution of the operation instruction, load/store instruction and branch instruction.
Figure 9B:
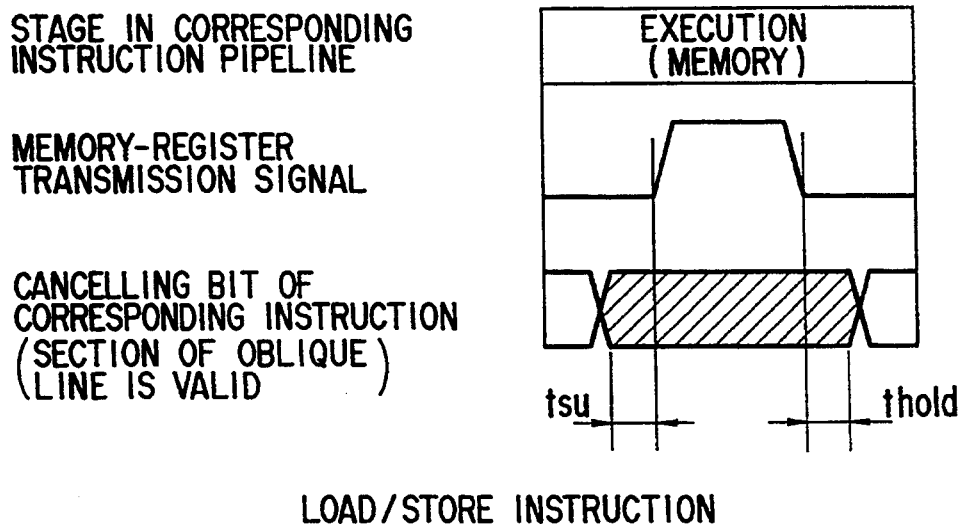
Figure 9C:
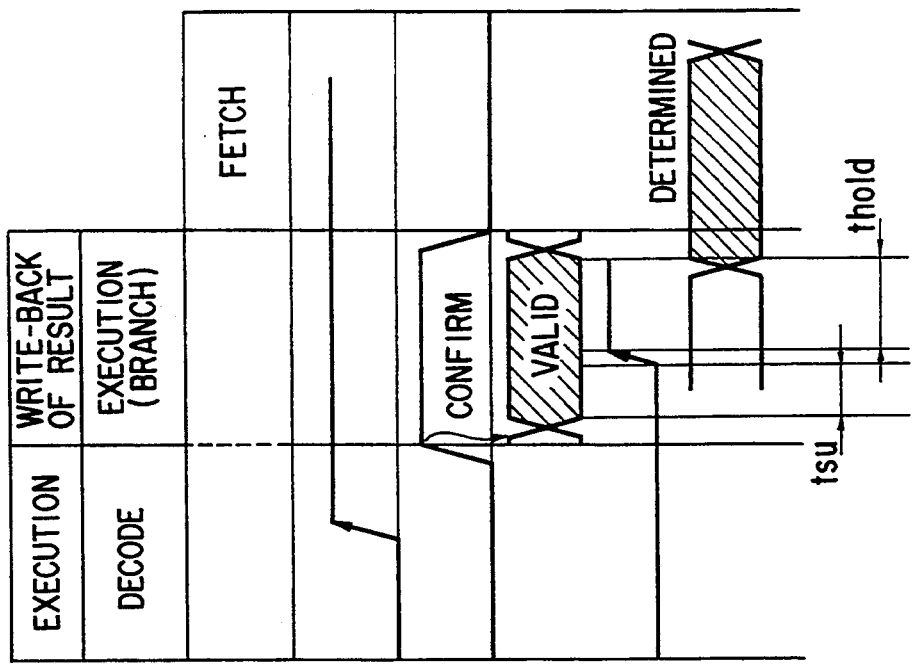

The operation instruction of FIG. 8 and timings in the case of execution of the load/store instruction and branch instruction are shown in FIGS. 9A to 9C. In FIGS. 9A to 9C, Tsu and Thold respectively indicate the set-up and hold times of a canceling bit used for the operation to be canceled. The canceling bit is an output of the Ex-OR gate 420 of FIG. 8, that is, a canceling signal.

As described above, a function of setting a particular flag unit 110 according to the condition and a function of canceling an instruction according to the content of a value set in the particular flag unit 110 are realized and the condition processing is effected by use of the above functions. With the system of this invention, the condition processing can be effected by use of a code having a higher efficiency and at a higher speed than in the conventional system and the effect thereof is significantly large in a computer of parallel processing system (system in which a plurality of instructions are simultaneously executed).

Cases wherein the system of this invention is applied to if-statements treated in FIGS. 1A and 1B are shown in FIGS. 10A and 10B, respectively. In the examples of FIGS. 10A and 10B, all the description are made by use of the C language and the flag register is expressed by F. Flag units constituting the flag register F are expressed by f0, f1, f2, f3 . . . arranged in this order from the least significant bit. As shown in FIGS. 10A and 10B, simultaneous determination of the compound condition indicated in (5) of FIGS. 10A and 10B can be attained by use of the system of this invention. In the example 1 of FIG. 10A, it is only required to generate a branch instruction only once, and in the example 2 of FIG. 10B, the if-statement can be executed without using any branch instruction and by using only three instructions. In a case where the "executable statement" of the example 1 can be executed by use of one instruction such as "i++:", the branch can be omitted by replacing portions (6), (7) and (8) by the following single instruction.

Instruction of ?!f1 "executable statement"; execute the instruction if f1=1.

(This instruction corresponds to (6), (7) and (8))

In the flag setting operation of (5) in FIG. 10A, a comparison with "8" is set as the condition. In this case, the condition for making the if-statement valid is that A is always true, and B or C is true, that is, f3=1 and f1=1 or f2=1. Therefore, when a value obtained by representing the value in the register R0 by the binary notation or [0 0 f3 f2 f1 0] is larger than 1000, that is, a value represented by the decimal notation is larger than 8, the if-statement is made valid. For this reason, when the value in the register R0 is larger than 8, f1 is set to 1 and then (7) is executed after canceling the next branch instruction.

FIGS. 11A and 11B show examples in which the system of this invention is applied to a computer of parallel processing system for simultaneously executing three or more instructions. In FIGS. 11A and 11B, the instructions are simultaneously executed for each line. In the system of this invention, the possibility that parallel execution of the condition determination and the condition execution instruction is effected is high. Therefore, instructions can be efficiently arranged and it is possible to make full use of the effect of enhancement of the operation speed due to the parallel processing system. The program statements in the example 1 of FIG. 11A and example 2 of FIG. 11B are the same as those of the examples of FIGS. 10A, 10B, 1A and 1B.

As described above, the system of this invention is extremely effective for enhancing the code creation efficiency in the condition processing and increasing the processing speed. The condition execution of instructions can be made by setting a flag according to the condition and specifying the flag unit for determining whether the instruction is canceled or not at the time of execution of instruction. For the instruction which is always executed, f0 among the flag units of the flag register may be set to "0" and the flag unit f0 may be specified as the canceling flag.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A program execution control system for controlling the execution of and cancellation of instructions for a processing unit of a computer having a main memory and registers, comprising:

exclusive register means including a plurality of flag means in which true and false data can be individually set and which can individually be specified as a flag for determining whether execution of each instruction in the program is canceled or not for each instruction, and having a function as an operand executing at least one of an integer operation, logic operation and comparison operation;

memory means for storing an instruction word, said instruction word including a flag specifying field for specifying at least predetermined said flag means in said exclusive register means for determining whether execution of the instruction is to be canceled or not based on said exclusive register means, and further including a condition specifying sub-operation code field for specifying a predetermined condition for an operand and a flag bit specifying operand field for specifying said particular flag means in said exclusive register means storing a result of true or false for given condition when the instruction sets said flag means;

setting means for setting the result of truth or falsehood of condition specified to the instruction of said condition specifying sub-operation code field into the flag means in said exclusive flag register means specified to the instruction of said flag bit specifying operand field when an instruction determining said flag means is executed; and canceling means coupled to said memory means for canceling the instruction according to at least one of a content of the, flag means in said exclusive register means and responsive thereto specified to the instruction of said flag bit specifying field and the content stored in said flag specifying field indicating to cancel the instruction either said flag means is "1" or "0".

2. A control system according to claim 1, wherein said flag means in said exclusive register means are constituted by flip-flops.

3. A control system according to claim 1, wherein said setting means includes:

a binary decoder having an input terminal and a plurality of output terminals, for outputting a logic value from one of said output terminals according to a value in said flag bit specifying field;

an operand comparator for outputting a preset signal based on the result of an operand value specified by said instruction word; and a first data selector for outputting a preset output to said exclusive register means according to a relationship between said operand comparator and said operand.

4. A control system according to claim 1, wherein said canceling means includes:

a second data selector for selecting a corresponding one of said flag means according to an input value from said flag specifying field and outputting an input value from said selected flag means; and an Ex-OR gate for outputting a canceling signal according to the input value from said flag specifying field and an input from said second data selector.

5. A control system according to claim 1, wherein said canceling means further comprises:

a memory port with inhibition input for transferring data between the main memory and a specified one of the registers in the computer, and inhibiting transferring data therebetween according to a first predetermined cancel signal; and a write-back mechanism with inhibition input for writing back the result of an operation instruction into a particular register, and inhibiting writing-back according to a second predetermined cancel signal.

6. A control system according to claim 5, wherein said canceling means includes means for supplying a canceling signal to said write-back mechanism with inhibition input.

7. A control system according to claim 5, wherein said canceling means includes means for supplying a canceling signal to said memory port with inhibition input.

8. A control system according to claim 1, wherein said canceling means further comprises:

two program counters for fetching an instruction next to a present instruction in the program and outputting an address of said next instruction; and a second data selector for selecting an output from one of said program counters and outputting an address of an instruction to be next fetched.

9. A control system according to claim 8, wherein said canceling means includes means for setting a branch destination address into one of said program counters which is not used now when a branch instruction is issued.

10. A control system according to claim 9, wherein said canceling means includes means for inhibiting change-over from the program counter which is now used to said program counter into which the branch destination address is set.

* * * * *